(12) United States Patent
Koga (10) Patent No.: US 12,110,663 B2
(45) Date of Patent: Oct. 8, 2024

(54) SHOVEL

(71) Applicant: SUMITOMO HEAVY INDUSTRIES, LTD., Tokyo (JP)

(72) Inventor: Masato Koga, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 285 days.

(21) Appl. No.: 17/655,239

(22) Filed: Mar. 17, 2022

(65) Prior Publication Data
US 2022/0205222 A1     Jun. 30, 2022

Related U.S. Application Data

(63) Continuation of application No. PCT/JP2020/035361, filed on Sep. 17, 2020.

(30) Foreign Application Priority Data

Sep. 18, 2019   (JP) .................. 2019-169179

(51) Int. Cl.
*E02F 9/26* (2006.01)
*G07C 5/08* (2006.01)
*E02F 3/32* (2006.01)
*E02F 9/22* (2006.01)

(52) U.S. Cl.
CPC .............. *E02F 9/26* (2013.01); *G07C 5/0808* (2013.01); *E02F 3/32* (2013.01); *E02F 9/2221* (2013.01); *E02F 9/2285* (2013.01); *E02F 9/2292* (2013.01); *E02F 9/2296* (2013.01)

(58) Field of Classification Search
CPC ... E02F 9/26; E02F 3/32; E02F 9/2221; E02F 9/2285; E02F 9/2292; E02F 9/2296; E02F 3/435; E02F 9/267; E02F 3/42; E02F 3/43; E02F 3/437; G07C 5/0808; G05B 23/0213; G05B 2219/2616
See application file for complete search history.

(56) References Cited

U.S. PATENT DOCUMENTS

| 2014/0052349 A1* | 2/2014 | Tsukane | E02F 9/267 |
| | | | 701/50 |
| 2015/0114731 A1 | 4/2015 | Tsukamoto | |
| 2020/0273267 A1* | 8/2020 | Takahashi | G06F 11/22 |

FOREIGN PATENT DOCUMENTS

| JP | S58-035609 | 3/1983 |
| JP | 2001-133295 | 5/2001 |
| JP | 2009-191463 | 8/2009 |
| JP | 2015-063864 | 4/2015 |
| WO | 2014/013910 | 1/2014 |

OTHER PUBLICATIONS

International Search Report for PCT/JP2020/035361 mailed on Dec. 8, 2020.

* cited by examiner

*Primary Examiner* — Michael V Kerrigan
(74) *Attorney, Agent, or Firm* — IPUSA, PLLC (57) ABSTRACT

A shovel includes a hardware processor configured to collect diagnostic data from a condition detecting sensor and to detect an abnormality based on the collected diagnostic data. The hardware processor is configured to continue to collect the diagnostic data, after detection of the abnormality during collection of the diagnostic data.

10 Claims, 6 Drawing Sheets

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2020/035361, filed on Sep. 17, 2020 and designating the U.S., which claims priority to Japanese Patent Application No. 2019-169179, filed on Sep. 18, 2019. The entire contents of the foregoing applications are incorporated herein by reference.

BACKGROUND

Technical Field

The present invention relates to shovels.

Description of Related Art

A shovel in which an operator causes the shovel to perform a specified operation following instructions on the specified operation displayed on a display in a cabin and a detection value from a sensor during the specified operation is stored in a storage in correlation with the specified operation has been known. The detection value from the sensor correlated with the specified operation is, for example, transmitted to a management apparatus to be used for a failure diagnosis of the shovel, etc.

SUMMARY

According to an embodiment of the present invention, a shovel includes a hardware processor configured to collect diagnostic data from a condition detecting sensor and to detect an abnormality based on the collected diagnostic data. The hardware processor is configured to continue to collect the diagnostic data, after detection of the abnormality during collection of the diagnostic data.

DETAILED DESCRIPTION

The related-art technique as described above does not consider the case where an operation is stopped because of an abnormality that occurs during the operation. Therefore, according to the related-art shovel, when an operation stops because of the occurrence of an abnormality, detection values that have been collected and temporarily retained so far are lost, so that information indicating the condition of the shovel at the occurrence of the abnormality cannot be obtained.

According to an embodiment of the present invention, it is possible to collect information indicating the condition of a shovel at the occurrence of an abnormality.

Figure 1:
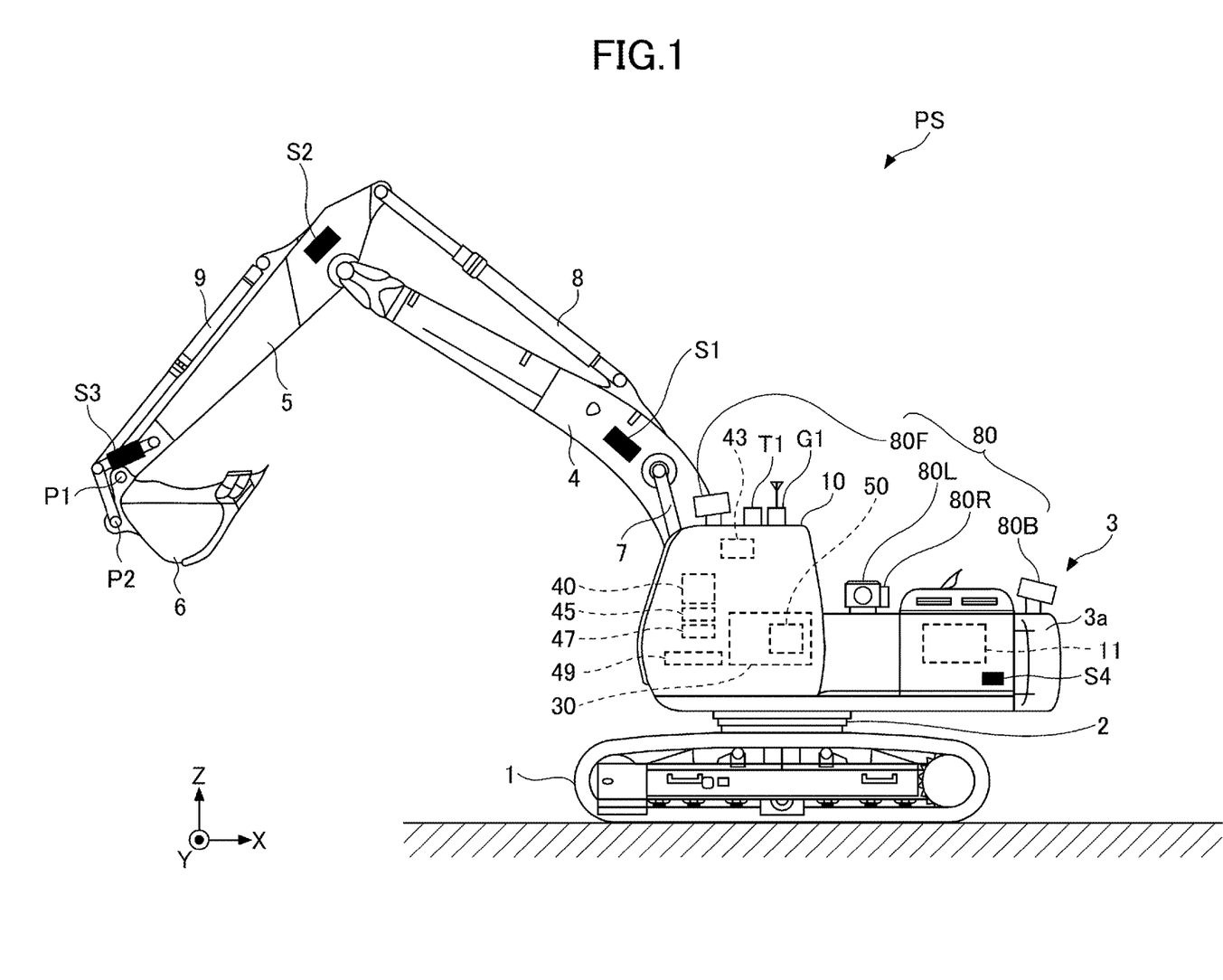
FIG. 1 is a side view of a shovel according to an embodiment of the present invention.

An embodiment is described below with reference to the drawings. FIG. 1 is a side view of an example of a shovel according to the embodiment.

According to a shovel PS, an upper swing structure 3 is swingably mounted on a lower traveling structure 1 via a swing mechanism 2. A boom 4 is attached to the upper swing structure 3. An arm 5 is attached to the distal end of the boom 4. A bucket 6 serving as an end attachment (working part) is attached to the distal end of the arm 5 with an arm top pin P1 and a bucket link pin P2. A slope bucket, a dredging bucket, a breaker or the like may alternatively be attached as the end attachment.

The boom 4, the arm 5, and the bucket 6 constitute an excavation attachment as an example of an attachment, and are hydraulically driven by a boom cylinder 7, an arm cylinder 8, and a bucket cylinder 9, respectively. A boom angle sensor S1 is attached to the boom 4. An arm angle sensor S2 is attached to the arm 5. A bucket angle sensor S3 is attached to the bucket 6. The excavation attachment may be provided with a bucket tilt mechanism. The boom angle sensor S1, the arm angle sensor S2, and the bucket angle sensor S3 may be referred to as "pose sensor(s)."

According to the embodiment of FIG. 1, each of the boom angle sensor S1, the arm angle sensor S2, and the bucket angle sensor S3 is constituted of a combination of an acceleration sensor and a gyroscope. At least one of the boom angle sensor S1, the arm angle sensor S2, and the bucket angle sensor S3 may be constituted of an acceleration sensor alone. Furtheimore, the boom angle sensor S1 may also be a stroke sensor attached to the boom cylinder 7, a rotary encoder, a potentiometer, an inertial measurement unit, or the like. The same is the case with the arm angle sensor S2 and the bucket angle sensor S3.

A power source such as an engine 11 and a vehicle body tilt sensor S4 are mounted on the upper swing structure 3, which is covered with a cover 3*a*. An image capturing device 80 is provided on top of the cover 3*a* of the upper swing structure 3. The image capturing device 80 includes a front monitoring camera 80F, a left side monitoring camera 80L, a back monitoring camera 80B, and a right side monitoring camera 80R.

A cabin 10 serving as a cab is provided on the upper swing structure 3. A GPS device (GNSS receiver) G1 and a transmitter T1 are provided at the top of the cabin 10. The GPS device (GNSS receiver) G1 detects the position of the shovel PS using a GPS function and feeds position data to a machine guidance device 50 included in a controller 30. The transmitter T1 transmits information to the outside of the shovel PS. The transmitter T1, for example, transmits information that a below-described management apparatus 90 can receive. Furthermore, the controller 30, a display device 40, a sound output device 43, an input device 45, and a storage 47 are provided in the cabin 10.

The controller 30 operates as a main control unit that controls the driving of the shovel PS. The controller 30 is constituted of processing circuitry including a central processing unit (CPU) and an internal memory. Various functions of the controller 30 are implemented by the CPU (processor) executing programs stored in the internal memory.

The controller 30 also operates as the machine guidance device 50 that provide guidance on operating the shovel PS. The machine guidance device 50, for example, notifies an operator of work information such as the distance between an intended surface that is the surface of an intended terrain set by the operator and the working part of the attachment. The distance between the intended surface and the working part of the attachment is, for example, the distance between the intended surface and the leading edge (teeth tips) or the back surface of the bucket 6 serving as the end attachment, the leading edge of a breaker serving as the end attachment, or the like. The machine guidance device 50 imparts work information to the operator via at least one of the display device 40, the sound output device 43, etc., to guide the operator in operating the shovel PS.

According to this embodiment, the machine guidance device 50 is incorporated into the controller 30. The machine guidance device 50 and the controller 30, however, may be separately provided. In this case, the same as the controller 30, the machine guidance device 50 is constituted of processing circuitry including a CPU and an internal memory. Various functions of the machine guidance device 50 are implemented by the CPU executing programs stored in the internal memory.

The display device 40 displays an image including various kinds of work information in response to a command from the machine guidance device 50 included in the controller 30. The display device 40 is, for example, an in-vehicle liquid crystal display connected to the machine guidance device 50.

The sound output device 43 outputs various kinds of sound information in response to a sound output command from the machine guidance device 50 included in the controller 30. The sound output device 43 includes, for example, an in-vehicle loudspeaker connected to the machine guidance device 50. The sound output device 43 may also include an alarm such as a buzzer.

The input device 45 is a device that the operator of the shovel PS uses to input various kinds of information to the controller 30 including the machine guidance device 50. The input device 45 includes, for example, a membrane switch provided at the surface of the display device 40. The input device 45 may also include a touchscreen or the like.

The storage 47 is a device form storing various kinds of information. The storage 47 is, for example, a nonvolatile storage medium such as a semiconductor memory. The storage 47 stores various kinds of information output by the controller 30 including the machine guidance device 50, etc.

A gate lock lever 49, which is a mechanism that prevents the shovel PS from being accidentally operated, is provided between the door and the operator seat of the cabin 10. The controller 30 performs control in such a manner as to close a gate lock valve 49a (see FIG. 2) when the gate lock lever 49 is pushed down and to open the gate lock valve 49a when the gate lock lever 49 is pulled up.

Figure 2:
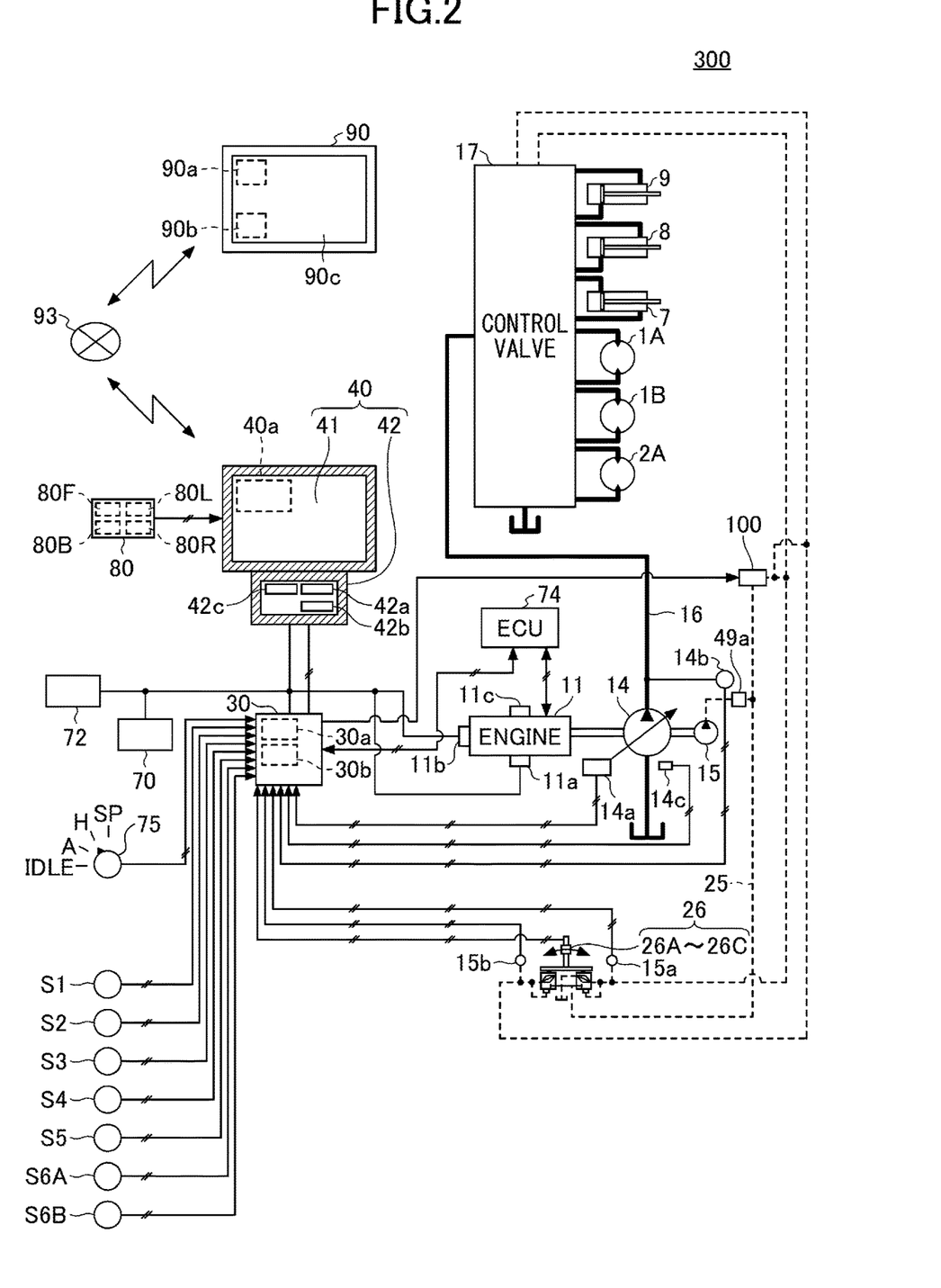
FIG. 2 is a block diagram illustrating an example configuration of a drive system of the shovel.

The gate lock valve 49a is a selector valve provided in an oil conduit between a control valve 17 and operating levers 26A through 26C (see FIG. 2). The gate lock valve 49a, which is configured to open and close in response to commands from the controller 30, may alternatively be mechanically connected to the gate lock lever 49 to open and close according to the movement of the gate lock lever 49.

The gate lock valve 49a is closed to interrupt the flow of hydraulic oil between the control valve 17 and the operating levers 26A through 26C, etc., to disable the operating levers 26A through 26C, etc. Furthermore, the gate lock valve 49a is opened to allow passage of hydraulic oil between the control valve 17 and the operating levers 26A through 26C, etc., to enable the operating levers 26A through 26C, etc. That is, when the operator rides on the operator seat and pulls up the gate lock lever 49, the operator is prevented from getting out of the cabin 10 and various operating devices 26 (see FIG. 2) are enabled (unlocked). When the operator pushes down the gate lock lever 49, the operator can get out of the cabin 10 and the various operating devices 26 are disabled (locked). Hereinafter, the operating devices 26 including the operating levers 26A through 26C may be collectively referred to as "operating device 26" when a description is common to the operating devices 26.

FIG. 2 is a block diagram illustrating an example configuration of the drive system of the shovel PS of FIG. 1. According to the example of FIG. 2, the shovel PS is included in a management system 300 of the shovel PS. The management system 300 includes the shovel PS and the management apparatus 90 that communicates with the shovel PS. A desired number of shovels PS may be included in the management system 300.

The drive system of the shovel PS includes the engine 11, a main pump 14, a pilot pump 15, the control valve 17, the operating device 26, the controller 30, an engine control unit (ECU) 74, an engine rotational speed adjustment dial 75, and an operation valve 100.

The engine 11, which is a power source of the shovel PS, is a diesel engine that operates to maintain a predetermined rotational speed, for example. The output shaft of the engine 11 is connected to the input shafts of the main pump 14 and the pilot pump 15.

The main pump 14, which is a hydraulic pump that supplies hydraulic oil to the control valve 17 via a high-pressure hydraulic line 16, is a swash plate variable displacement hydraulic pump, for example.

The pilot pump 15, which is a hydraulic pump for supplying hydraulic oil to various hydraulic control devices via a pilot line 25, is a fixed displacement hydraulic pump, for example.

The control valve 17 is a hydraulic control valve that controls a hydraulic system in the shovel PS. The control valve 17 selectively supplies hydraulic oil supplied from the main pump 14 to one or more of the boom cylinder 7, the arm cylinder 8, the bucket cylinder 9, a right travel hydraulic motor LA, a left travel hydraulic motor 1B, and a swing hydraulic motor 2A, for example. In the following description, the boom cylinder 7, the arm cylinder 8, the bucket cylinder 9, the right travel hydraulic motor LA, the left travel hydraulic motor 1B, and the swing hydraulic motor 2A are collectively referred to as "hydraulic actuators."

The operating device 26, which is a device that the operator uses to operate the hydraulic actuators, supplies hydraulic oil supplied from the pilot pump 15 to a pilot port of a flow control valve corresponding to a hydraulic actuator via the pilot line 25. The pressure of hydraulic oil supplied to each pilot port is a pressure commensurate with the direction of operation and the amount of operation of a corresponding one of the operating levers 26A through 26C corresponding to the hydraulic actuators.

The controller 30, which is an example of processing circuitry configured to control the shovel PS, is constituted of, for example, a computer including a CPU, a random access memory (RAM), and a read-only memory (ROM). The CPU of the controller 30 reads programs corresponding to operations and functions of the shovel PS from the ROM and runs the programs while loading the programs into the RAM to execute processes corresponding to the programs.

The ECU 74 is a device that controls the engine 11. The ECU 74, for example, outputs the amount of fuel injection, etc., for controlling the rotational speed of the engine 11 to the engine 11 according to an engine rotational speed (mode) set by the operator with the engine rotational speed adjustment dial 75, based on a command value from the controller 30.

The engine rotational speed adjustment dial 75 is a dial for adjusting the rotational speed of the engine 11, and is configured to select the engine rotational speed from four levels according to this embodiment. For example, the engine rotational speed adjustment dial 75 is configured to switch the engine rotational speed between four levels: SP mode, H mode, A mode, and IDLE mode. FIG. 2 illustrates a state where H mode is selected with the engine rotational speed adjustment dial 75.

SP mode is a work mode that is selected when it is desired to prioritize workload, and uses the highest engine rotational speed. H mode is a work mode that is selected when it is desired to balance workload and fuel efficiency, and uses the second highest engine rotational speed. A mode is a work mode that is selected when it is desired to operate the shovel PS with low noise while prioritizing fuel efficiency, and uses the third highest engine rotational speed. IDLE mode is a work mode that is selected when it is desired to idle the engine, and uses the lowest engine rotational speed. The engine 11 is controlled to a constant rotational speed at the engine rotational speed of the work mode set with the engine rotational speed adjustment dial 75.

The operation valve 100 is a valve that the controller 30 uses to operate the hydraulic actuators, and supplies hydraulic oil supplied from the pilot pump 15 to a pilot port of a flow control valve corresponding to each hydraulic actuator via the pilot line 25. The pressure of hydraulic oil supplied to each pilot port is a pressure commensurate with a control signal from the controller 30. The operation valve 100 is provided on at least one of the rod side and the bottom side, and may be provided on both of the rod side and the bottom side, according to a specified operation with respect to the boom cylinder 7, the arm cylinder 8, and the bucket cylinder 9 of the boom 4, the arm 5, and the bucket 6 constituting the attachment.

Furthermore, the operation valve 100 is provided on at least one of the discharge side and the intake side, and may be provided on both of the discharge side and the intake side, with respect to the right travel hydraulic motor 1A, the left travel hydraulic motor 1B, and the swing hydraulic motor 2A.

In this case, even when the operating device 26 is in a neutral position, it is possible to execute a specified operation. Furthermore, a pressure reducing valve placed between the operating device 26 and the control valve 17 may be caused to operate as the operation valve 100. In this case, by transmitting a pressure reduction command from the controller 30 to the pressure reducing valve with the operating device 26 being tilted to the maximum, it is possible to provide the control valve 17 with a stable operation command.

Furthermore, the display device 40 is provided in the shovel PS.

The display device 40 is connected to the controller 30 via a communications network such as a controller area network (CAN) or a local interconnect network (LIN). The display device 40 may alternatively be connected to the controller 30 via a dedicated line.

The display device 40 includes a conversion process part 40a configured to generate an image to be displayed on an image display part 41. The conversion process part 40a generates a camera image to be displayed on the image display part 41 based on the output of the image capturing device 80. Therefore, the image capturing device 80 is connected to the display device 40 via a dedicated line, for example. Furthermore, the conversion process part 40a generates an image to be displayed on the image display part 41 based on the output of the controller 30.

The image capturing device 80 includes the front monitoring camera 80F, the left side monitoring camera 80L, the back monitoring camera 80B, and the right side monitoring camera 80R.

The front monitoring camera 80F is provided on the front of the cabin 10, for example, the roof or the like of the cabin 10, to capture an image of an area in front of the shovel PS and an image of the motion of the boom 4, the arm 5, and the bucket 6. The left side monitoring camera 80L is, for example, provided on the left side of the top of the cover 3a of the upper swing structure 3 to capture an image of an area to the left of the shovel PS.

The back monitoring camera 80B is provided on the back of the upper swing structure 3, for example, the back side of the top of the cover 3a of the upper swing structure 3, to capture an image of an area behind the shovel PS. The right side monitoring camera 80R is, for example, provided on the right side of the top of the cover 3a of the upper swing structure 3 to capture an image of an area to the right of the shovel PS. The front monitoring camera 80F, the left side monitoring camera 80L, the back monitoring camera 80B, and the right side monitoring camera 80R are, for example, digital cameras containing an imaging device such as a charge-coupled device (CCD) or a complementary metal-oxide-semiconductor (CMOS) and transmit respective captured images to the display device 40 provided in the cabin 10.

The conversion process part 40a may be implemented not as a function of the display device 40 but as a function of the controller 30. In this case, the image capturing device 80 is connected to not the display device 40 but the controller 30.

Furthermore, the display device 40 includes a switch panel serving as an input part 42. The switch panel includes various hardware switches. The switch panel includes, for example, a light switch 42a, a windshield wiper switch 42b, and a windshield washer switch 42c as hardware buttons.

The light switch 42a is a switch for switching the on and off of lights attached outside the cabin 10. The windshield wiper switch 42b is a switch for switching the moving and stopping of a windshield wiper. The windshield washer switch 42c is a switch for spraying windshield washer fluid.

The display device 40 operates with electric power supplied from a rechargeable battery 70. The rechargeable battery 70 is charged with electric power generated by an alternator 11a (generator) of the engine 11. The electric power of the rechargeable battery 70 is also supplied to electrical equipment 72, etc., of the shovel PS besides the controller 30 and the display device 40. A starter 11b of the engine 11 is driven with electric power from the rechargeable battery 70 to start the engine 11.

The engine 11 is controlled by the ECU 74. Various data indicating the condition of the engine 11 (for example, data indicating coolant water temperature detected with a water temperature sensor 11c) are constantly transmitted from the ECU 74 to the controller 30 via a communications network such as a CAN.

Accordingly, the controller 30 can store these data in a temporary storage 30a and transmit the data to the display device 40 when needed.

In the following description, various data indicating the condition of the engine 11 transmitted from the ECU 74 to the controller 30 via a CAN may be referred to as CAN data. Accordingly, data indicating coolant water temperature detected with the water temperature sensor 11c are included in the CAN data. Furthermore, the CAN data include a command value input to the ECU 74 from the controller 30, the rotational speed of the engine 11, and the amount of fuel injection (an engine load factor).

According to this embodiment, the ECU 74 may be used as one of condition detecting sensors for detecting the condition of the engine 11. In this case, the CAN data are included in the detection values (output data) of the condition detecting sensors. In the following description, it is assumed that the CAN data are included in the detection values of the condition detecting sensors.

Furthermore, various data are fed to the controller 30 as described below, and are stored in the temporary storage 30a of the controller 30. The stored data may be transmitted to the display device 40 when needed.

First, data indicating a swash plate tilt angle are transmitted from a regulator 14a of the main pump 14, which is a variable displacement hydraulic pump, to the controller 30. Furthermore, data indicating the discharge pressure of the main pump 14 are transmitted from a discharge pressure sensor 14b to the controller 30. Furthermore, an oil temperature sensor 14c is provided in a conduit between the main pump 14 and a tank that stores hydraulic oil that the main pump 14 takes in. Data indicating the temperature of hydraulic oil flowing through the conduit are transmitted from the oil temperature sensor 14c to the controller 30.

Furthermore, pilot pressures that are transmitted to the control valve 17 when the operating levers 26A through 26C are operated are detected at oil pressure sensors 15a and 15b, and data indicating the detected pilot pressures are transmitted to the controller 30.

Furthermore, data indicating the setting of the engine rotational speed are constantly transmitted from the engine rotational speed adjustment dial 75 to the controller 30.

Furthermore, the shovel PS and the management apparatus 90 can communicate with each other via a communications network 93.

The management apparatus 90 is, for example, a computer or the like that is installed in the manufacturer of the shovel PS or a service center, and enables a specialized staffer (a designer or the like) to be aware of the conditions of the shovel PS from a remote place. The controller 30 can accumulate data on detections values from various condition detecting sensors included in the shovel PS in the temporary storage 30a or the like and transmit the accumulated data to the management apparatus 90. Thus, data obtained during a specified operation are transmitted to the management apparatus 90 as diagnosis data.

The controller 30 may have a radio communication function to be able to communicate with the management apparatus 90 via the communications network 93. The specialized staffer analyzes the data on detection values from various condition detecting sensors, transmitted from the shovel PS to the management apparatus 90 and received by a reception part 90a of the management apparatus 90, and determines the condition of the shovel PS.

For example, the specialized staffer may diagnose the presence or absence of a failure or malfunction, and if there is a failure or malfunction, may identify the location of the failure or malfunction and the cause of the failure or malfunction. This makes it possible to bring components necessary for the maintenance or repair of the shovel PS in advance to reduce time spent on the maintenance or repair of the shovel PS. Functions of the controller 30 are described in detail below.

Furthermore, the management apparatus 90 includes a processing part 90b. A predetermined program may be input to the processing part 90b in advance, and the processing part 90b may perform operations on the detection values from various condition detecting sensors transmitted from the shovel PS with the program. For example, the processing part 90b may contain an input diagnosis program and may perform a failure diagnosis and a failure prediction using the detection values (including the CAN data) of the condition detecting sensors transmitted from the shovel PS with the diagnosis program. The results of the operations performed by the processing part 90b may be displayed on a display part 90c of the management apparatus 90.

The management apparatus 90 may be an apparatus that can communicate with the shovel PS indirectly via a server or the like installed in the manufacturer of the shovel PS or a service center. Furthermore, the management apparatus 90 may be either a computer permanently installed in the manufacturer or a service center or a portable computer that can be carried by a person in charge of work, for example, a so-called smartphone, table terminal, or the like that is a multifunctional portable information terminal serving as a portable terminal.

When the management apparatus 90 is portable, the management apparatus 90 can be carried to an inspection or repair site. Therefore, it is possible to perform inspection or repair work while looking at the display (display part 90c) of the management apparatus 90, thus improving the efficiency of the inspection or repair work.

Furthermore, in the case of using a portable terminal, short-range communications such as Bluetooth (registered trademark) or infrared communications may be used to directly communicate with the shovel PS without going through a communications network. In this case, an instruction to perform a specified operation is transmitted from the portable terminal to the shovel PS through an operation such as a screen input or speech input to the portable terminal. That is, an instruction to store detection values from the condition detecting sensors during the performance of a specified operation in correlation with the specified operation is transmitted from the portable terminal to the shovel PS. Then, by transmitting the results of the specified operation from the shovel PS to the portable terminal, it is possible to check the results of the specified operation on the screen of the portable terminal.

The condition detecting sensors included in the shovel PS detect the operations of parts of the shovel PS. The condition detecting sensors include the boom angle sensor S1, the arm angle sensor S2, the bucket angle sensor S3, the vehicle body tilt sensor S4, a swing angular velocity sensor S5, a right travel rotation sensor S6A, and a left travel rotation sensor S6B.

The boom angle sensor S1 is provided at the support (joint) of the boom 4 on the upper swing structure 3 to detect the angle of the boom 4 from a horizontal plane (a boom angle). Any angle sensor, for example, a rotary potentiometer, may be used for the boom angle sensor S1. The same is the case with the below-described arm angle sensor S2 and bucket angle sensor S3. The detected boom angle is transmitted to the controller 30.

The arm angle sensor S2 is provided at the support (joint) of the arm 5 on the boom 4 to detect the angle of the arm 5 relative to the boom 4 (an arm angle). The detected arm angle is transmitted to the controller 30. The bucket angle sensor S3 is provided at the support (joint) of the bucket 6 on the arm 5 to detect the angle of the bucket 6 relative to the arm 5 (a bucket angle). The detected bucket angle is transmitted to the controller 30.

The vehicle body tilt sensor S4 is a sensor to detect the tilt angles of the shovel PS in two axial directions (a longitudinal direction and a lateral direction) relative to a horizontal plane. Any tilt sensor, for example, a liquid-filled capacitive tilt sensor, may be used for the vehicle body tilt sensor S4. The detected tilt angle is transmitted to the controller 30.

The swing angular velocity sensor S5 detects the swing angle of the upper swing structure 3 swung by the swing mechanism 2. Any angle sensor, for example, a rotary encoder, may be used for the swing angular velocity sensor S5. The detected swing angle is transmitted to the controller 30.

The right travel rotation sensor S6A and the left travel rotation sensor S6B detect the rotational speed of the right travel hydraulic motor 1A and the rotational speed of the left travel hydraulic motor 1B, respectively. Any rotation sensor, for example, a magnetic rotation sensor, may be used for the right travel rotation sensor S6A and the left travel rotation sensor S6B. The detected rotational speeds are transmitted to the controller 30.

Furthermore, as described above, the condition detecting sensors included in the shovel PS include the regulator 14a, the discharge pressure sensor 14b, the oil temperature sensor 14c, the oil pressure sensors 15a and 15b, the engine rotational speed adjustment dial 75, the image capturing device 80, and the ECU 74. Detection values detected by these sensors as well are transmitted to the controller 30.

Accordingly, the detection values of the condition detecting sensors according to this embodiment include operation information indicating the operation of each part of the shovel PS and information indicating the condition of the engine 11 of the shovel PS.

The data transmitted from the above-described condition detecting sensors included in the shovel PS to the controller 30 are stored in the temporary storage 30a of the controller 30.

Figure 3:
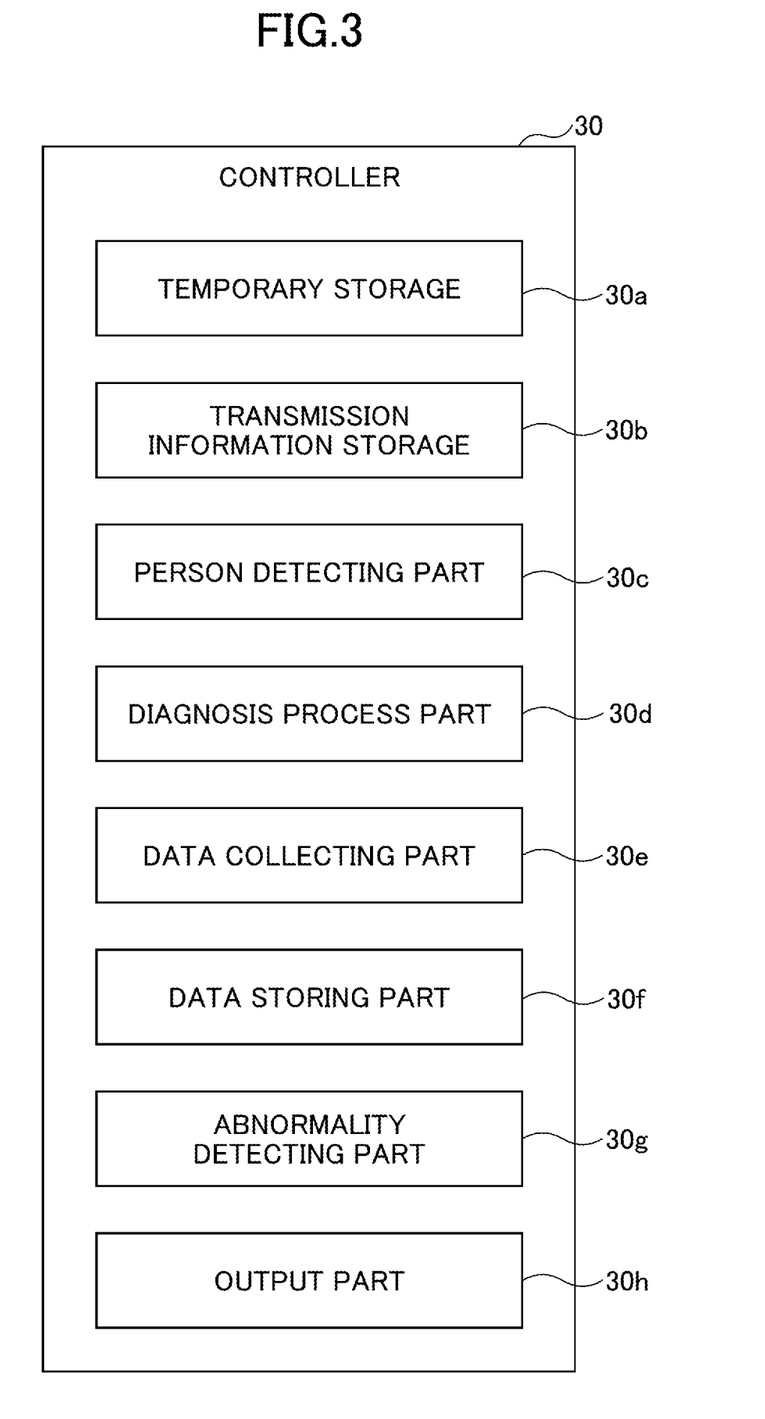
FIG. 3 is a diagram illustrating functions of a controller of the shovel.

Next, functions of the controller 30 according to this embodiment are described with reference to FIG. 3. FIG. 3 is a diagram illustrating functions of the controller 30.

The controller 30 according to this embodiment includes the temporary storage 30a, a transmission information storage 30b, a person detecting part 30c, a diagnosis process part 30d, a data collecting part 30e, a data storing part 30f, an abnormality detecting part 30g, and an output part 30h.

The temporary storage 30a is a storage implemented by a volatile memory. Data on detection values from the condition detecting sensors included in the shovel PS are temporarily stored in the temporary storage 30a. The detection values of the condition detecting sensors stored in the temporary storage 30a may include the CAN data.

Specifically, the detection values of the condition detecting sensors obtained during a specified operation are stored in the temporary storage 30a.

The transmission information storage 30b is a storage implemented by a nonvolatile memory. Transmission information to be transmitted to the management apparatus 90 are stored in the transmission information storage 30b. The transmission information are described in detail below.

The person detecting part 30c detects a person present in an area surrounding the shovel PS based on data on an image of the area surrounding the shovel PS captured by the image capturing device 80. In other words, the person detecting part 30c determines whether there is a person or the like in the area surrounding the shovel PS. Various human body detecting sensors capable of detecting a person are usable in determining whether there is a person in the area surrounding the shovel PS. The person detecting part 30c may also serve as an object detecting part to detect an object other than a person using a sensor capable of detecting the object.

The diagnosis process part 30d perform various diagnoses according to, for example, locations of the shovel PS to be diagnosed using detection values of the condition detecting sensors. Accordingly, it may be said that the detection values of the condition detecting sensors are diagnostic data used for the diagnosis of the shovel PS performed by the diagnosis process part 30d. A process of the diagnosis process part 30d is described in detail below.

The data collecting part 30e collects (obtains) the detection values of the condition detecting sensors during a specified operation for the diagnosis process part 30d performing a diagnosis, and stores the collected detection values in the temporary storage 30a. In other words, the data collecting part 30e collects diagnostic data used for diagnosing the shovel PS from the condition detecting sensors.

Furthermore, according to this embodiment, when the below-described abnormality detecting part 30g detects an abnormality, the data collecting part 30e continues to collect the detection values of the condition detecting sensors for a certain period after the detection of the abnormality, and stores the collected detection values in the temporary storage 30a.

The data storing part 30f stores the detection values of the condition detecting sensors temporarily stored in the temporary storage 30a in the transmission information storage 30b as transmission information to be transmitted to the management apparatus 90.

Specifically, the data storing part 30f correlates information identifying a specified operation performed for a diagnosis performed by the diagnosis process part 30d and the detection values of the condition detecting sensors with each other and stores the correlated information and detection values in the transmission information storage 30b.

At this point, when the specified operation ends with no abnormality detected during the specified operation, the data storing part 30f correlates information identifying a specified operation performed at this point with the detection values of the condition detecting sensors obtained during this specified operation, and stores the information and the detection values in the transmission information storage 30b as normal-time transmission information.

At this point, the normal-time transmission information may include machine body identification information for identifying the shovel PS and information indicating the date of the performance of the specified operation.

Furthermore, when the specified operation ends in the middle because of the occurrence of an abnormality during the specified operation, the data storing part 30f correlates the detection values of the condition detecting sensors obtained before the detection of the abnormality and after the detection of the abnormality, information identifying the specified operation, and information indicating the detection of the abnormality during the specified operation with one another, and stores the correlated detection values and information in the transmission information storage 30b as abnormal-time transmission information.

At this point, the abnormal-time transmission information may include machine body identification information for identifying the shovel PS and information indicating the date of the performance of the specified operation. Furthermore, the abnormal-time transmission information may also include an abnormality code indicating the type of an abnormality detected by the abnormality detecting part 30g. The abnormality code is, for example, retained in the abnormality detecting part 30g in correlation with the type of an abnormality and may be identified when the abnormality detecting part 30g detects an abnormality.

Thus, the normal-time transmission information of the time when a specified operation ends normally and the abnormal-time transmission information of the time when an abnormality is detected during a specified operation are stored in the transmission information storage 30b. Thus, the diagnostic data include the normal-time transmission information and the abnormal-time transmission information.

The abnormality detecting part 30g detects an abnormality in the shovel PS during a specified operation for the diagnosis process part 30d performing a diagnosis.

Specifically, the abnormality detecting part 30g detects an abnormality that has occurred in the shovel PS based on the detection values of the condition detecting sensors collected by the data collecting part 30e. In other words, the abnormality detecting part 30g detects an abnormality based on the diagnostic data during the collection of the diagnostic data by the condition detecting sensors.

Examples of abnormalities detected by the abnormality detecting part 30g include a stopping such as a stall of the engine 11, the absence of the output of a command value determined as a specified operation from the controller 30, and an abnormality in a pilot conduit.

The output part 30h outputs transmission information stored in the transmission information storage 30b. More specifically, according to this embodiment, when the abnormal-time transmission information is stored in the transmission information storage 30b at the start of the controller 30, the output part 30h transmits this abnormal-time transmission information to the management apparatus 90. The start of the controller 30 is the start of supplying electric power to the controller 30.

According to this embodiment, transmitting transmission information stored in the transmission information storage 30b to the management apparatus 90 may be described as outputting transmission information. Furthermore, according to this embodiment, displaying transmission information stored in the transmission information storage 30b on the display device 40 of the shovel PS may be described as outputting transmission information.

Figure 4:
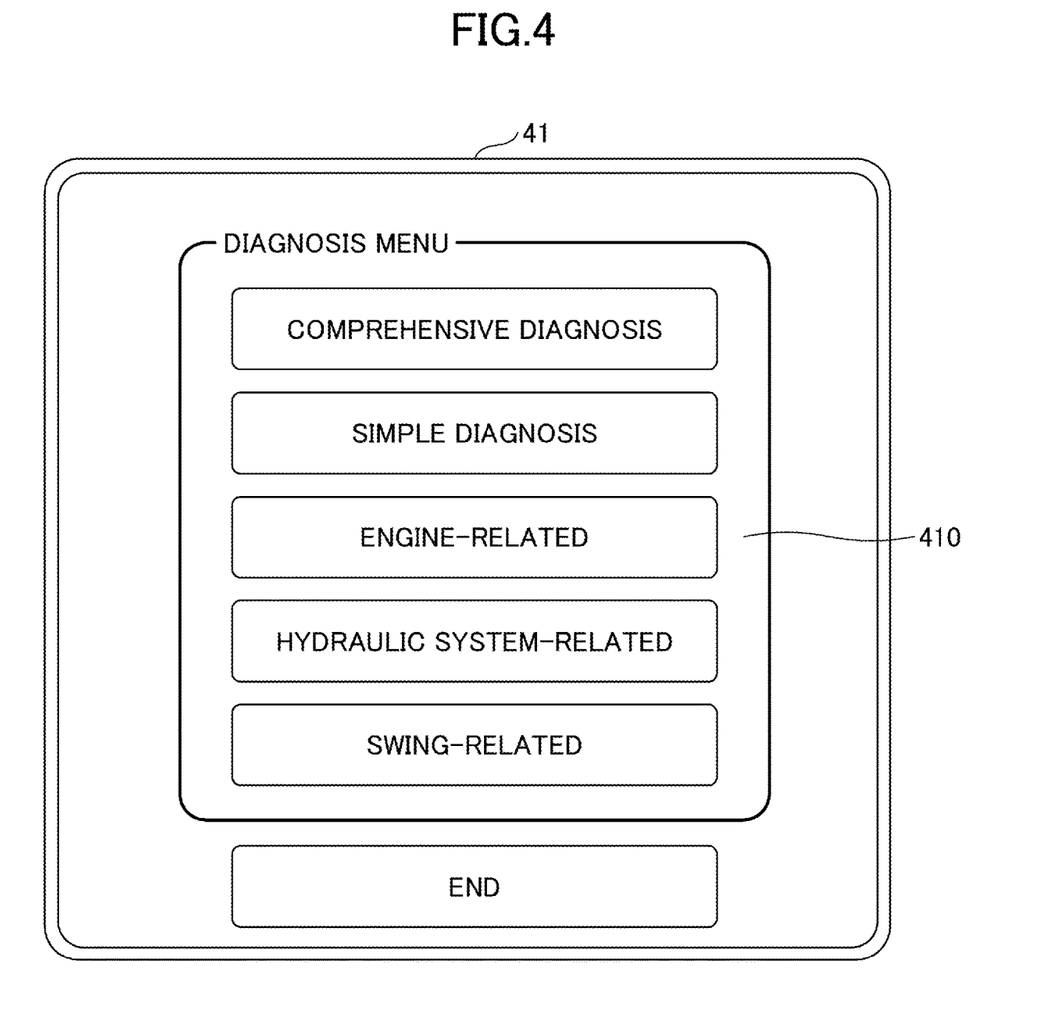
FIG. 4 is a diagram illustrating an example of a diagnosis menu selection screen displayed on an image display part of a display device of the shovel.

Next, a process of the diagnosis process part 30d according to this embodiment is described. FIG. 4 is a diagram illustrating an example of a diagnosis menu selection screen displayed on the image display part 41.

As illustrated in FIG. 4, the diagnosis menu selection screen includes a diagnosis menu display part 410. An image displayed in the diagnosis menu display part 410 is generated from various data transmitted from the controller 30 by the conversion process part 40a of the display device 40.

In the diagnosis menu display part 410, a list of multiple diagnosis items corresponding to diagnosis locations or the like is displayed. According to the example illustrated in FIG. 4, a list of six diagnosis items, namely, COMPREHENSIVE DIAGNOSIS, SIMPLE DIAGNOSIS, BUCKET DIAGNOSIS, ENGINE-RELATED, HYDRAULIC SYSTEM-RELATED, and SWING-RELATED, are is displayed in the diagnosis menu display part 410. The diagnosis items are prestored in the ROM of the controller 30 or the like. One or more types of specified operations may be performed for a diagnosis for each diagnosis item.

Furthermore, a menu item END that is used to end the display of the diagnosis menu selection screen is displayed on the image display part 41. The operator can select any diagnosis item by touching a diagnosis item that the operator wishes to carry out on the diagnosis menu selection screen displayed on the image display part 41. A diagnosis item may be selected by, for example, operating a button instead of touching.

COMPREHENSIVE DIAGNOSIS is a diagnosis item that comprehensively diagnoses whether each part of the shovel PS is normal, and is correlated with, for example, engine-related, hydraulic system-related, and swing-related specified operations (motions).

When the operator selects COMPREHENSIVE DIAGNOSIS, the controller 30 performs the engine-related, hydraulic system-related, and swing-related specified operations of the shovel PS in predetermined order, and correlates information identifying each performed specified operation and the corresponding detection values of the condition detecting sensors obtained during each specified operation with each other. Furthermore, COMPREHENSIVE DIAGNOSIS may be correlated with other specified operations instead of or in addition to the above-described specified operations (engine-related, hydraulic system-related, and swing-related specified operations).

The specified operations for collecting the diagnosis data of this diagnosis may be automatically performed, or may be manually performed with the lever operations of the operator by displaying each specified operation of the diagnosis on the display device 40 as guidance.

Each specified operation is an operation performed by the controller 30 driving the shovel PS based on a command value of a predetermined pattern, in which variations in human operations are reduced.

SIMPLE DIAGNOSIS is a diagnosis item that diagnoses whether each part of the shovel PS is normal in a simplified manner, and is correlated with, for example, specified operations that are one or some engine-related specified operations and one or some hydraulic system-related specified operations that include neither the attachment operation nor the swing operation of the shovel PS. When the operator selects SIMPLE DIAGNOSIS, the controller 30 performs one or some engine-related specified operations and one or some hydraulic system-related specified operations of the shovel PS and correlates information identifying each performed specified operation and the detection values of the condition detecting sensors obtained during each specified operation with each other.

Furthermore, SIMPLE DIAGNOSIS may be correlated with other specified operations instead of or in addition to the above-described specified operations (one or some engine-related specified operations and one or some hydraulic system-related specified operations).

ENGINE-RELATED is a diagnosis item that includes one or more specified operations for diagnosing whether the engine 11 is normal. When the operator selects ENGINE-RELATED, the controller 30 performs one or more engine-related specified operations of the shovel PS.

HYDRAULIC SYSTEM-RELATED is a diagnosis item that includes one or more specified operations for diagnosing whether the hydraulic system is normal, and includes, for example, one or more specified operations for diagnosing hydraulic pumps such as the main pump 14 and the pilot pump 15 and hydraulic actuators.

HYDRAULIC SYSTEM-RELATED includes, for example, "closing the arm to a stroke end (arm closing operation)" as a specified operation a and "raising the boom to a stroke end with the arm closed (boom raising operation)" as a specified operation 13. Furthermore, HYDRAU- LIC SYSTEM-RELATED may include other specified operations instead of or in addition to the above-described specified operations (specified operations a and Here, an example of a specified operation for the attachment such as the boom 4 or the arm 5 is described. First, the controller 30 outputs a command to the operation valve 100 to pivot the boom 4 to the stroke end at the time of boom raising, and thereafter, continuously applies a load to the boom 4. That is, the controller 30 controls the control valve 17 such that hydraulic oil continuously flows to the boom cylinder 7. In this state, because the boom 4 has reached the stroke end, hydraulic oil is discharged to a tank through a relief valve. Thus, by causing the boom 4 to reach the stroke end of the boom cylinder 7, it is possible to continuously apply a load to the boom 4.

This makes it possible to stably detect data for a diagnosis with good reproducibility in any work environment. The same is the case with the arm 5 and the bucket 6. Furthermore, after the boom 4 reaches the stroke end of the boom cylinder 7, the load may be changed by adjusting the regulator 14*a* of the main pump 14 or changing the engine rotational speed.

By detecting a change in the cylinder pressure of the attachment such as the boom 4 or a change in the discharge pressure of the main pump 14 at the time of changing the load, it is possible to reproduce a dynamic state to further improve diagnostic accuracy. As a result, not only a hydraulic circuit but also the main pump 14 and the engine 11 can be diagnosed.

SWING-RELATED is a diagnosis item including one or more specified operations for diagnosing whether the swing mechanism 2 (the swing hydraulic motor 2A, a swing speed reducer, etc.) is normal. SWING-RELATED includes, for example, "swinging with the attachment closed (swing operation)" as a specified operation. Furthermore, SWING-RELATED may include other specified operations instead of or in addition to the above-described specified operations (swing operation as a specified operation). Here, an example of a specified operation for a drive mechanism using a swing or travel hydraulic motor is described.

First, the controller 30 outputs a command to the operation valve 100 to set the attachment such as the boom 4 in a predetermined pose. This is because, in the diagnosis of swinging in particular, a swing load is significantly affected by a swing moment of inertia based on a change in the pose of the attachment. Therefore, the boom 4, the arm 5, the bucket 6, etc., are driven to set the attachment in a predetermined pose.

Furthermore, when a relatively heavy end attachment such as a breaker is attached instead of the bucket 6, the operator may be notified to change the end attachment to a predetermined bucket (the bucket 6) with a sound or through a display screen. Thus, the attachment is adjusted before driving the swing drive mechanism to make the moment of inertia generated during swinging uniform. After the adjustment is completed, the controller 30 outputs a predetermined drive command to the operation valve 100 to cause a swing operation to be performed. The swing hydraulic motor 2A can perform a specified operation for swinging based on a drive command to accelerate, rotate at a constant speed, and decelerate the swing hydraulic motor 2A.

This makes it possible to diagnose the swing hydraulic motor 2A, a hydraulic circuit for the swing hydraulic motor 2A, and the swing speed reducer. For example, a failure in a relief valve of the hydraulic circuit decreases swing acceleration. This failure can be identified by a change in the pressure detection value of the hydraulic circuit of the swing hydraulic motor 2A.

Figure 5:
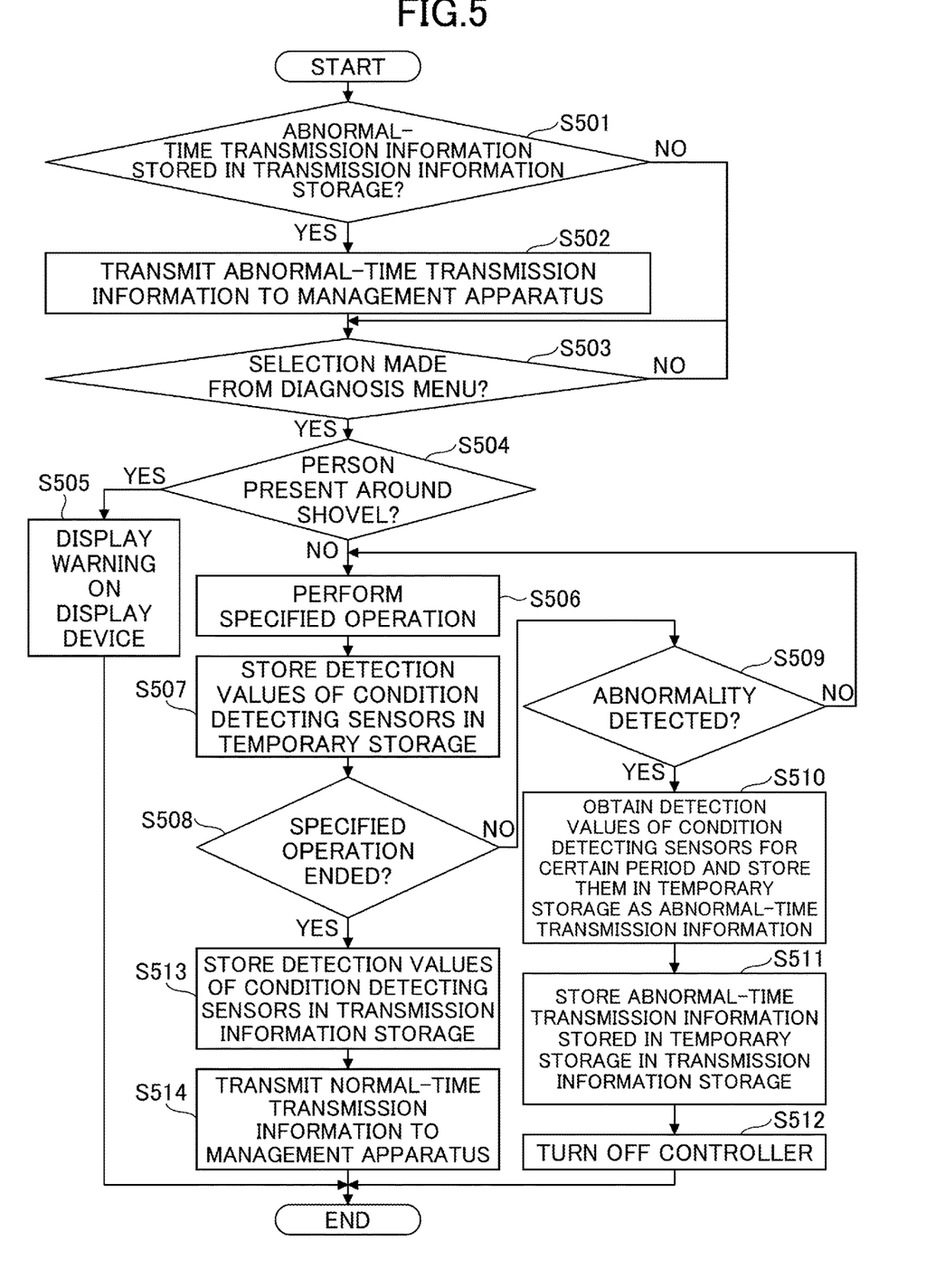
FIG. 5 is a flowchart illustrating a process of the controller of the shovel.

Next, a process of the controller 30 according to this embodiment is described with reference to FIG. 5. FIG. 5 is a flowchart illustrating a process of the controller 30.

According to this embodiment, when the controller 30 starts, at step S501, the output part 30*h* determines whether the abnormal-time transmission information is stored in the transmission information storage 30*b*. In response to determining at step S501 that the abnormal-time transmission information is stored in the transmission information storage 30*b* (YES at step S501), at step S502, the output part 30*h* transmits this abnormal-time transmission information to the management apparatus 90, and the controller 30 proceeds to step S503.

In response to determining at step S501 that no abnormal-time transmission information is stored in the transmission information storage 30*b* (NO at step S501), the controller 30 proceeds to step S503.

At step S503, the diagnosis process part 30*d* of the controller 30 determines whether a diagnosis item is selected on the diagnosis menu selection screen by the operator. In response to determining at step S503 that no diagnosis item is selected (NO at step S503), the controller 30 waits until a diagnosis item is selected. In response to determining at step S503 that a diagnosis item is selected (YES at step S503), at step S504, the person detecting part 30*c* of the controller 30 determines whether an object such as a person is present in an area surrounding the shovel PS.

In response to determining at step S504 that, for example, a person is present in the surrounding area (YES at step S504), at step S505, the controller 30 causes a warning indicating the presence of a person in the surrounding area to be displayed on the display device 40, and stops the operation of the shovel PS and ends the process of the diagnosis process part 30*d*.

In response to determining at step S504 that no object is detected in the surrounding area (NO at step S504), at step S506, the diagnosis process part 30*d* of the controller 30 causes a specified operation correlated with the selected diagnosis item to start.

Next, at step S507, the data collecting part 30*e* of the controller 30 collects the detection values of the condition detecting sensors and stores the collected detection values in the temporary storage 30*a*.

Next, at step S508, the diagnosis process part 30*d* of the controller 30 determines whether the specified operation has ended. In response to determining at step S508 that the specified operation has ended (YES at step S508), the controller 30 proceeds to step S513 described below.

In response to determining at step S508 that the specified operation has not ended (NO at step S508), at step S509, the controller 30 determines whether an abnormality has been detected by the abnormality detecting part 30*g*.

In response to determining at step S509 that no abnormality has been detected (NO at step S509), the controller 30 returns to step S506.

In response to determining at step S509 that an abnormality has been detected (YES at step S509), at step S510, the data collecting part 30*e* of the controller 30 continues to collect the detection values of the condition detecting sensors for a certain period and stores the collected detection values in the temporary storage 30*a*.

Next, at step S511, the data storing part 30*f* of the controller 30 correlates information for identifying the specified operation and information indicating the occurrence of the abnormality with the detection values of the condition detecting sensors to generate abnormal-time transmission information, and stores the abnormal-time transmission information in the transmission information storage 30b.

Next, at step S512, the controller 30 turns off to end the process.

In response to determining at step S508 that the specified operation has ended (YES at step S508), at step S513, the data storing part 30f correlates information for identifying the specified operation with the detection values of the condition detecting sensors to generate normal-time transmission information, and stores the normal-time transmission information in the transmission information storage 30b. Next, at step S514, the output part 30h of the controller 30 transmits the normal-time transmission information stored in the transmission information storage 30b to the management apparatus 90, and ends the process.

The management apparatus 90 performs a diagnosis based on a predetermined algorithm using information received from the controller 30. After performing a diagnosis using the algorithm, the management apparatus 90 may transmit a diagnosis result to the controller 30 of the shovel PS, an assist device, or both the controller 30 and the assist device. This makes it possible to check the diagnosis result on the display device 40 of the shovel PS and the assist device. The assist device is a portable computer that can be carried by a worker such as the operator, and may be, for example, a so-called smartphone, table terminal, or the like that is a multifunctional portable information terminal serving as a portable terminal. The assist device may be configured to communicate with the management apparatus 90 via the communications network 93.

The case where it is determined at step S509 that an abnormality has been detected is described in detail below. According to this embodiment, for example, the abnormality detecting part 30g determines that the engine 11 has stopped and detects the stopping of the engine 11 as an abnormality when the rotational speed of the engine 11 becomes less than or equal to a predetermined value (speed), based on the CAN data included in the detection values of the condition detecting sensors.

In the shovel PS, when the stopping of the engine 11 is detected, the alternator 11a stops generating electric power. Therefore, when the alternator 11a is the power source of the controller 30, the supply of electric power to the controller 30 stops when the engine 11 stops.

Therefore, according to this embodiment, when the stopping of the engine 11 is detected by the abnormality detecting part 30g, the controller 30 switches its power source from the alternator 11a to the rechargeable battery 70.

Then, the controller 30 communicates with the ECU 74 with electric power supplied from the rechargeable battery 70, and obtains the CAN data obtained by the ECU 74 after the detection of the stopping of the engine 11. In other words, after the rotational speed of the engine 11 becomes less than or equal to a predetermined value (speed), the controller 30 operates with electric power supplied from the rechargeable battery 70, and obtains information indicating the condition of the engine 11 from the ECU 74, which is one of the condition detecting sensors.

Furthermore, during the period from the detection of the rotational speed of the engine 11 becoming less than or equal to a predetermined value (speed) to the complete stop of the rotation of the engine 11, the controller 30 may communicate with the ECU 74 to obtain information indicating the condition of the engine 11.

After the detection values of the condition detecting sensors stored in the temporary storage 30a are transferred from the temporary storage 30a to and stored in the transmission information storage 30b, which is a permanent memory, the controller 30 cuts off the supply of electric power from the rechargeable battery 70 to turn off.

Thus, according to this embodiment, when the stopping of the engine 11 is detected, the detection values stored in the temporary storage 30a are stored in the transmission information storage 30b and the controller 30 thereafter turns off.

Furthermore, according to this embodiment, the detection values may be continuously collected and stored in the temporary storage 30a for a certain period after the detection of the stopping of the engine 11. Then, after the detection values stored in the temporary storage 30a are transferred to and stored in the transmission information storage 30b, which is a permanent memory, as the abnormal-time transmission information, the controller 30 turns off.

Thus, according to this embodiment, even when the stopping of the engine 11 is detected, the controller 30 does not immediately turn off to make it possible to obtain the detection values of the condition detecting sensors before and after the detection of the stopping of the engine 11. Thus, even in the case of an incomplete specified operation, it is ensured that the diagnostic data are stored in a storage.

Furthermore, according to this embodiment, when the controller 30 starts, it is determined whether abnormal-time transmission information that has not been transmitted is stored in the transmission information storage 30b. The storage of the abnormal-time transmission information in the transmission information storage 30b indicates the forced termination of the previous operation due to the detection of an abnormality during the operation.

Thus, according to this embodiment, when the controller 30 starts, it is determined whether the abnormal-time transmission information is stored in the transmission information storage 30b, and when the abnormal-time transmission information is stored, this abnormal-time transmission information is transmitted to the management apparatus 90.

Thus, according to this embodiment, even when the specified operation is incomplete, it is ensured that the diagnostic data are transmitted to the management apparatus 90. Examples of transmitted diagnostic data include a command value, the amount of lever operation, engine coolant water temperature, hydraulic oil temperature, boost pressure, engine rotational speed, pump discharge pressure, engine fuel injection pressure, a load factor, and atmospheric pressure. With these diagnostic data, it is possible to analyze whether a command value is abnormal, whether a drive mechanism such as the engine 11 is abnormal, etc.

Furthermore, according to this embodiment, for example, when a command value input to the ECU 74 from the controller 30 is different from a command value for causing a specified operation to be performed, the abnormality detecting part 30g may detect this as an abnormality.

In this manner, even when the operation of the shovel PS is suspended because of the detection of an abnormality, it is possible to transmit the abnormal-time transmission information at the time of the detection of the abnormality to the management apparatus 90.

In response to receiving the abnormal-time transmission information from the shovel PS, the management apparatus 90 may display the abnormal-time transmission information on the display or the like of the management apparatus 90. Furthermore, the output part 30h of the shovel PS may display the abnormal-time transmission information on the display device 40 of the shovel PS.

Figure 6:
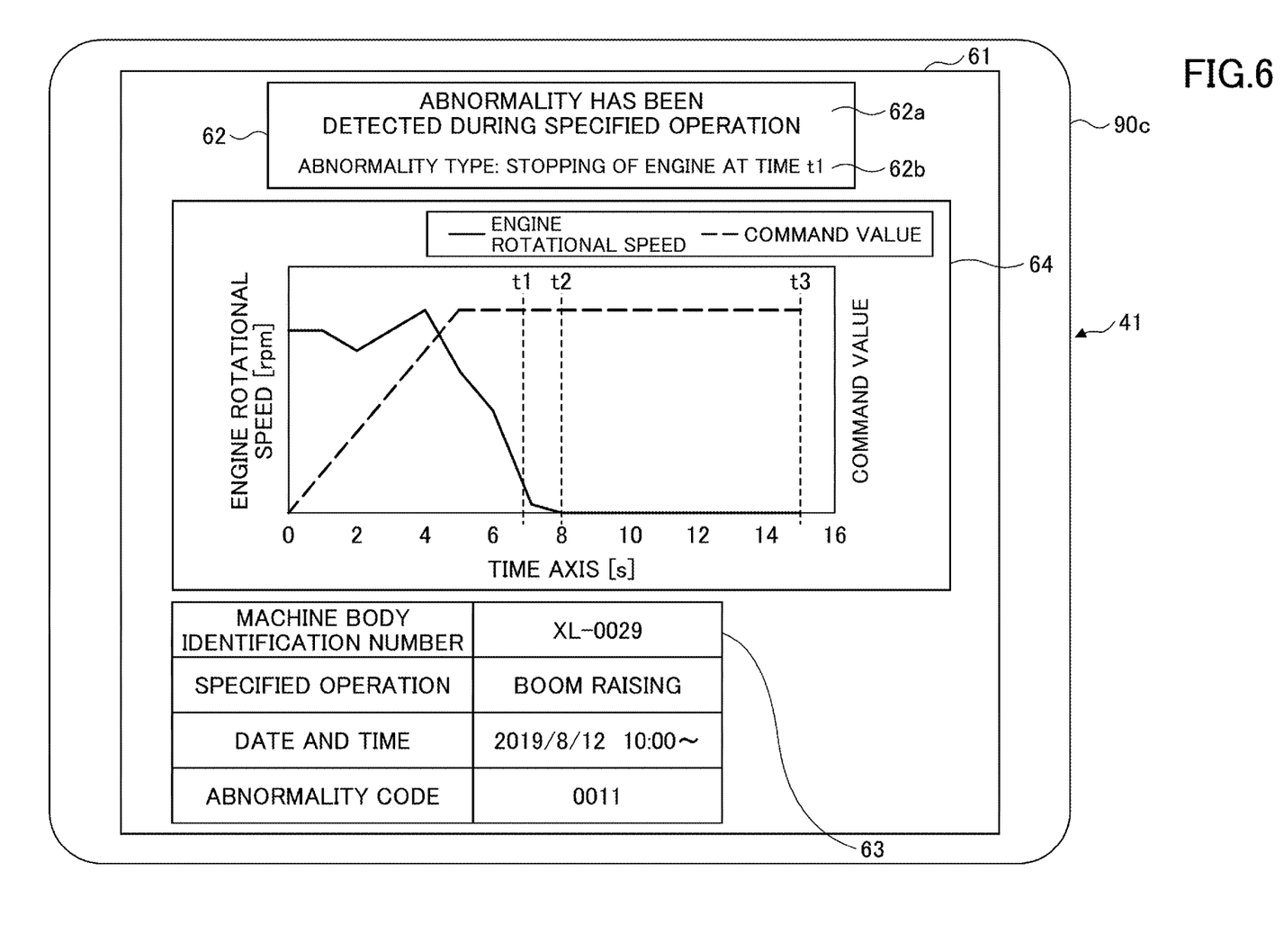
FIG. 6 is a diagram illustrating a display example of abnormal-time transmission information.

FIG. 6 is a diagram illustrating an example of the displaying of the abnormal-time transmission information. A screen 61 illustrated in FIG. 6 illustrates, for example, an example of the displaying of the abnormal-time transmission information on the display part 90c of the management apparatus 90. The screen 61 may also be displayed on the display device 40 of the shovel PS.

The screen 61 includes a display area 62, a display area 63, and a display area 64. In the display area 62, information indicating the detection of an abnormality during a specified operation is displayed.

Specifically, in FIG. 6, information 62a indicating the detection of an abnormality during a specified operation and information 62b indicating the type of the detected abnormality are displayed in the display area 62. According to the example of FIG. 6, the detected abnormality is the stopping of the engine 11.

Furthermore, the specified operation is the operation of making a transition from a predetermined first specified pose to a predetermined second specified pose. Accordingly, the specified operation starts with the first specified pose and ends with the second specified pose. The first specified pose and the second specified pose may be either different from or equal to each other. That is, the specified operation may be either the operation of changing the pose from a specified pose to another specified pose or the operation of making a predetermined motion from a specified pose and thereafter returning to the specified pose.

In the display area 63, machine body identification information identifying the shovel PS, information indicating the date and time of performance of a specified operation, information identifying a performed specified operation, and an abnormality code are displayed. The information identifying a specified operation is, for example, the name of a specified operation.

According to FIG. 6, it is understood from the displayed contents of the display area 62 and the displayed contents of the display area 63 that the stopping of the engine 11 was detected at timing t1 shown in the display area 64 during a specified operation "boom raising" performed on Aug. 12, 2019.

In the display area 64, changes over time in the rotational speed of the engine 11 and a command value related to boom raising output from the controller 30 to the operation valve 100 among the detection values of the condition detecting sensors are displayed in a graph.

As indicated by the graph displayed in the display area 64, a boom raising command is generated at time 0 (s). As a result of this boom raising command, not only the boom 4 but also the arm 5 and the bucket 6 rise. While the engine rotational speed decreases because of a load generated at this time, the ECU 74 detects this decrease in the engine rotational speed to output an injection command commensurate with the decrease in the engine rotational speed. As a result, the engine rotational speed starts to recover at time 2 (s).

When the piston in the boom cylinder 7 reaches a stroke end at time 4 (s), however, the pressure inside the hydraulic circuit increases. Therefore, the load applied to the engine 11 further increases to again decrease the engine rotational speed.

Thus, the graph displayed in the display area 64 shows that the detection values of the condition detecting sensors are continuously obtained from before to after time t1, which is the time of detection of the stopping of the engine 11 by the abnormality detecting part 30g.

Thus, according to this embodiment, it is possible to visualize how the rotational speed changes from time t1 to time t2 at which the rotational speed of the engine 11 becomes zero.

In the screen 61, information other than the information shown in the display areas 62, 63 and 64 may also be displayed. Specifically, in the screen 61, information indicating the location of the occurrence of an abnormality in the shovel PS may be displayed using, for example, an image showing the shape of the shovel PS. Furthermore, all of the display areas 62, 63 and 64 do not have to be displayed in the screen 61. At least the display area 64 may be displayed in the screen 61.

Furthermore, in the graph displayed in the display area 64, time "0" is the time of the start of the recording of the diagnostic data. Time "0" may also be the time of the start of the specified operation.

Furthermore, a worker can display not only the command value and the engine rotational speed as illustrated in FIG. 6 but also physical quantities such as the amount of lever operation, engine coolant water temperature, hydraulic oil temperature, boost pressure, pump discharge pressure, engine fuel injection pressure, a load factor, and atmospheric pressure as desired.

Furthermore, according to this embodiment, the detection values collected until time t2, at which the rotational speed of the engine 11 becomes zero, and stored in the temporary storage 30a may be transferred to the transmission information storage 30b between time t2 and time t3. During this period, the controller 30 is supplied with electric power from the rechargeable battery 70 to stay ON.

Furthermore, according to this embodiment, the period from time t1 to time t3 may be defined as a predetermined period, and the detection values of the condition detecting sensors may be collected until time t3 and stored in the temporary storage 30a. In this case, the controller 30 stays ON before the transfer of the detection values stored in the temporary storage 30a to the transmission information storage 30b is completed after time t3. In other words, the controller 30 stays activated until the diagnostic data have been transferred from the temporary storage 30a, which is a volatile memory, to the transmission information storage 30b, which is a nonvolatile memory.

Thus, according to this embodiment, even when the stopping of the engine 11 is detected by the abnormality detecting part 30g, the controller 30 stays ON and information indicating the condition of the shovel PS stored in the temporary storage 30a is transferred to the transmission information storage 30b.

Then, the controller 30 turns off after the completion of the transfer. In other words, according to this embodiment, in response to the completion of the transfer of the diagnostic data from the temporary storage 30a, which is a volatile memory, to the transmission information storage 30b, which is a nonvolatile memory, the supply of electric power to the controller 30 is cut off.

Thus, according to this embodiment, operation information indicating the operation of each part of the shovel PS and information indicating the condition of the engine 11 at the occurrence of an abnormality can be collected and stored. That is, according to this embodiment, it is possible to collect information indicating the condition of the shovel PS at the occurrence of an abnormality.

Furthermore, according to this embodiment, even after the detection of the abnormality, the operation information indicating the operation of each part of the shovel PS and the information indicating the condition of the engine 11 can be obtained. Thus, according to this embodiment, it is possible to compare the condition of the shovel PS before the occurrence of the abnormality and the condition of the shovel PS after the occurrence of the abnormality.

Moreover, according to this embodiment, the operation information indicating the operation of the shovel PS is collected together with the information indicating the condition of the engine 11. Thus, according to this embodiment, it is possible to correlate the operation of the shovel PS at the detection of an abnormality in the engine 11 with the abnormality, for example.

Because of these, this embodiment can contribute to the identification of the cause of an abnormality that occurs in the shovel PS.

According to the example of FIG. 6, the rotational speed of the engine 11 and the command value are displayed in a graph as changes in the detection values of the condition detecting sensors. This embodiment, however, is not limited to this. For example, according to this embodiment, values other than the rotational speed of the engine 11 and the command value may be displayed.

Furthermore, according to this embodiment, the abnormality detecting part 30g detects the occurrence of an abnormality during a specified operation. This embodiment, however, is not limited to this. For example, the abnormality detecting part 30g may detect an abnormality also in the case of operating only the engine 11 with the shovel PS being stationary, such as in a warm-up operation or a regeneration operation of an exhaust gas treatment device.

Furthermore, the abnormality detecting part 30g may also detect an abnormality in the midst of an operation of the shovel PS other than a specified operation. Specifically, for example, even while the operator is performing work by operating the shovel PS, the abnormality detecting part 30g may detect an abnormality when the abnormality occurs.

When the abnormality detecting part 30g detects the abnormality, the controller 30 may continue to collect the detection values of the condition detecting sensors after the detection of the abnormality the same as during a specified operation as described above.

An embodiment of the present invention is described in detail above. The present invention, however, is not limited to the specifically disclosed embodiment, and variations and modifications may be made without departing from the scope of the present invention.

What is claimed is:

1. A shovel comprising:
   an engine configured to generate electric power;
   a rechargeable battery configured to store the electric power;
   a hardware processor configured to collect diagnostic data from a condition detecting sensor and to detect an abnormality based on the collected diagnostic data,
   wherein the hardware processor is configured to continue to collect the diagnostic data, after detection of the abnormality during collection of the diagnostic data, and
   wherein the hardware processor is operated by the electric power that is generated by the engine and the electric power that is supplied from the rechargeable battery.

2. The shovel as claimed in claim 1, wherein
   the hardware processor is configured to transfer the diagnostic data stored in a volatile memory to a nonvolatile memory after the detection of the abnormality, and
   the hardware processor is configured to be kept activated during transfer of the diagnostic data.

3. The shovel as claimed in claim 2, wherein the hardware processor is disconnected from a power source after completion of the transfer of the diagnostic data.

4. The shovel as claimed in claim 1, wherein the hardware processor is configured to output information in which the diagnostic data collected before the detection of the abnormality, the diagnostic data collected after the detection of the abnormality, and information indicating the detection of the abnormality are correlated.

5. The shovel as claimed in claim 4 wherein the hardware processor is configured to output information in which information indicating an operation of the shovel during the collection of the diagnostic data, the diagnostic data collected before the detection of the abnormality, the diagnostic data collected after the detection of the abnormality, and the information indicating the detection of the abnormality are correlated.

6. The shovel as claimed in claim 5, wherein the operation of the shovel is a predetermined specified operation.

7. The shovel as claimed in claim 6, wherein the specified operation is correlated with a selected diagnosis item.

8. The shovel as claimed in claim 6, wherein the hardware processor is configured to, in response to the detection of the abnormality during the collection of the diagnostic data, store the diagnostic data in correlation with information for identifying the specified operation and the information indicating the detection of the abnormality with the diagnostic data in a storage.

9. The shovel as claimed in claim 6, wherein the hardware processor is configured to, in response to normal ending of the collection of the diagnostic data, store the diagnostic data in correlation with information for identifying the specified operation in a storage.

10. A shovel comprising:
    a hardware processor configured to collect diagnostic data from a condition detecting sensor and to detect an abnormality based on the collected diagnostic data,
    wherein the hardware processor is configured to continue to collect the diagnostic data, after detection of the abnormality during collection of the diagnostic data,
    wherein the hardware processor is configured to output information in which the diagnostic data collected before the detection of the abnormality, the diagnostic data collected after the detection of the abnormality, and information indicating the detection of the abnormality are correlated,
    wherein the hardware processor is configured to output information in which information indicating an operation of the shovel during the collection of the diagnostic data, the diagnostic data collected before the detection of the abnormality, the diagnostic data collected after the detection of the abnormality, and the information indicating the detection of the abnormality are correlated,
    wherein the operation of the shovel is a predetermined specified operation, and
    wherein the hardware processor is configured to determine presence or absence of a person in an area surrounding the shovel before a start of the specified operation.

* * * * *